US007280515B2

(12) United States Patent
Ranta

(10) Patent No.: US 7,280,515 B2
(45) Date of Patent: Oct. 9, 2007

(54) METHOD AND ARRANGEMENT FOR IMPLEMENTING FAST SIGNALLING IN AN ASYMMETRIC COMMUNICATION CONNECTION

(75) Inventor: Pekka Ranta, Nummela (FI)

(73) Assignee: Nokia Corporation, Espoo (FI)

( * ) Notice: Subject to any disclaimer, the term of this patent is extended or adjusted under 35 U.S.C. 154(b) by 764 days.

(21) Appl. No.: 09/975,491

(22) Filed: Oct. 10, 2001

(65) Prior Publication Data

US 2002/0044564 A1 Apr. 18, 2002

(30) Foreign Application Priority Data

Oct. 13, 2000 (FI) .................................. 20002263

(51) Int. Cl.
```
H04J 3/00    (2006.01)
H04J 3/16    (2006.01)
H04B 7/212   (2006.01)
H04B 7/00    (2006.01)
H04Q 7/20    (2006.01)
```
(52) U.S. Cl. ...................... 370/337; 370/347; 370/468; 455/452.2; 455/69
(58) Field of Classification Search ........ 370/319–321, 370/328–329, 342–347, 337, 468; 455/452.2, 455/453, 524, 69
See application file for complete search history.

(56) References Cited

U.S. PATENT DOCUMENTS

| | | | | |
|---|---|---|---|---|
| 5,212,715 A | * | 5/1993 | Pickert et al. ............... | 375/366 |
| 5,577,024 A | * | 11/1996 | Malkamaki et al. ........ | 370/335 |
| 5,625,872 A | * | 4/1997 | Sawyer ....................... | 370/435 |
| 5,628,052 A | | 5/1997 | DeSantis et al. ........... | 455/33.3 |
| 5,673,259 A | * | 9/1997 | Quick, Jr. .................... | 370/342 |
| 5,799,091 A | * | 8/1998 | Lodenius ..................... | 380/270 |
| 5,862,132 A | * | 1/1999 | Blanchard et al. .......... | 370/342 |
| 5,896,385 A | | 4/1999 | Achilleoudis ............... | 370/443 |
| 6,078,572 A | * | 6/2000 | Tanno et al. ................. | 370/335 |
| 6,097,772 A | * | 8/2000 | Johnson et al. ............. | 375/346 |
| 6,456,627 B1 | * | 9/2002 | Frodigh et al. ............. | 370/465 |
| 6,571,101 B1 | * | 5/2003 | Schulz ........................ | 455/450 |
| 6,661,777 B1 | * | 12/2003 | Blanc et al. ................. | 370/252 |

FOREIGN PATENT DOCUMENTS

| | | |
|---|---|---|
| DE | 19647629 A1 | 5/1998 |
| WO | WO96/25807 | 8/1996 |
| WO | WO 00/38350 | 6/2000 |
| WO | WO 00/52852 | 9/2000 |

* cited by examiner

*Primary Examiner*—Wing Chan
*Assistant Examiner*—Hong Sol Cho
(74) *Attorney, Agent, or Firm*—Perman & Green, LLP

(57) ABSTRACT

A method and an arrangement are disclosed for implementing fast signalling in a communication connection between a base station and a mobile station of a cellular radio network. There is defined an arrangement of repeatedly occurring frames that consist of pieces of allocatable radio communication capacity between the base station and mobile stations communicating therewith. Pieces of radio communication capacity are allocated from the arrangement of repeatedly occurring frames to dedicated communication channels. A certain piece of radio communication capacity is allocated from the arrangement of repeatedly occurring frames to a non-dedicated fast signalling channel between the mobile stations and the base station. This piece of radio communication capacity allocated to a non-dedicated fast signalling channel is used for conveying fast signalling messages between at least one mobile station and the base station.

23 Claims, 5 Drawing Sheets

METHOD AND ARRANGEMENT FOR IMPLEMENTING FAST SIGNALLING IN AN ASYMMETRIC COMMUNICATION CONNECTION

TECHNOLOGICAL FIELD

The invention concerns generally the technology of transmitting limited amounts of control information over a communication connection. Especially the invention concerns the transmission of such control information in the uplink direction, also known as the reverse direction, of a wireless communication connection between a base station and a mobile station.

BACKGROUND OF THE INVENTION

The information to be transmitted between a base station and a mobile station in a cellular radio network can be basically categorised into user data and signalling, of which the latter refers to the transmission of such information which the stations use mostly to monitor and control the smooth operation of the communications connection. In order to facilitate the administration of communications resources there are usually defined separate channels for user data and signalling. For example in the known GSM (Global System for Mobile telecommunications) system three basic types of signalling channels have been defined: the SACCH (Slow Associated Control CHannel), the FACCH (Fast Associated Control CHannel) and the SDCCH (Standalone Dedicated Control CHannel). The first two of these being "associated" control channels means that a certain dedicated user data channel must exist before the definition of these control channels makes sense. The SACCH occupies every $26^{th}$ of the regularly occurring burst periods allocated to a full-rate circuit-switched communications channel. Other implemented or suggested SACCH timetables exist for other than full-rate channels. The FACCH does not have a regularly occurring allocated radio resource: whenever an FACCH message needs to be sent, a burst or a part thereof is "stolen" from its original use of conveying user data and used to convey signalling information instead. The SDCCH, which is sometimes referred to as the TCH/8 (Traffic Channel at eighth rate), corresponds to the allocation of one burst period from every eighth TDMA (Time Division Multiple Access) frame for the duration of an active communications connection on SDCCH.

The expansion of the use of cellular radio networks from circuit-switched voice telephony towards wireless internet applications means that the old definitions of channels and connections need to be revised. At the priority date of this patent application it is assumed that in many cases the needs for communications resources will be highly asymmetric, which means that the amount and rate of information to be transmitted in one direction over the radio interface is much larger than that transmitted in the other direction. For example network browsing involves only a limited amount of lookup and download command data to be sent in the reverse direction while the amount of data downloaded in the forward direction from network pages to a terminal device may be fairly large. EDGE (Enhanced Datarates for GSM Evolution) and the services relying on it, EGPRS and EHSCSD (Enhanced General Packet Radio Service, Enhanced High Speed Circuit Switched Data), introduce several known schemes for implementing high-capacity channels especially in the downlink direction but also for uplink.

Even a communication connection which is nominally unidirectional may benefit from the possibility of transmitting a limited amount of information also in the other direction. As an example, let us consider a nominally unidirectional wireless communication connection where the transmitting station employs transmitter diversity. In other words, there are at least two transmitting antennas located far enough from each other for the envelope correlation of signal fading between them to be relatively low. Data is transmitted blockwise through each antenna. The data blocks transmitted through different antennas are otherwise the same but equipped with different training sequences. This difference enables the receiving station to estimate the phase difference between the signals which it receives from said different transmitting antennas. Fast feedback should be employed in order to make the transmitting station to adapt the relative phasing of the transmitting antennas so that the signals add constructively in the receiving station. In another antenna diversity arrangement both antennas transmit with even the same training sequence, and the phase difference between antennas is first changed in a random fashion. The receiving station provides feedback that describes the effect of the random changes on constructive adding at the receiving end. By comparing the feedback to the history of changes the transmitting station learns quickly, what is the currently optimal phase difference between transmitting antennas. It is easy to understand that the volume of information concerning the amount of constructive adding or the phase difference estimated at the receiving station and provided as fast feedback in the reverse direction is minimal compared to that of the data transmitted in the nominal transmission direction.

Transmission power control of the closed-loop type requires always some feedback information to be conveyed to the station the transmission power of which is to be controlled. Within the framework of ECSD (Enhanced Circuit Switched Data) of EDGE (Enhanced Data rates for GSM Evolution) the concept of fast power control has been standardised for novel circuit-switched services. Fast power control aims at keeping the signal level or the signal quality at the receiving station at an adequate level. However, few fast power control methods are known that would also be suitable for use in packet-switched connections with asymmetric capacity requirements.

The concept of adaptive beam forming, especially closed-loop adaptive beam forming, resembles transmitter diversity in the sense that the correctly selected and adapted physical processing of the signal at the transmitting station requires a minimal but finite amount of feedback information to be transmitted in the reverse direction. On the basis of the received feedback the transmitting device that uses adaptive beam forming selects dynamically the antenna parameter values so that the resulting antenna beam is optimal to a certain distant receiver. The basic difference between beam forming and transmitter diversity is that in the former the parallelly transmitting antennas are located much closer to each other than in the latter. Consequently signal fading is largely correlated between antennas and changes in phase difference are slower. Adaptive beam forming techniques can cope with sparser feedback signalling than transmitter diversity.

Other transmission technologies, which are known as such but would benefit from fast asymmetric reverse signalling are for example various header compression techniques and statistical multiplexing.

SUMMARY OF THE INVENTION

It is an object of the present invention to provide a method and an arrangement for implementing fast signalling in a communication connection with potentially asymmetric capacity requirements.

The objects of the invention are accomplished by defining a generally non-dedicated piece of transmission capacity at the radio interface as a fast signalling channel which is available for a relatively large number of devices that need to transmit fast signalling. Certain aspects of the invention are also accomplished by making such devices first check, whether the fast signalling needs could be fulfilled by using an existing dedicated channel, so that the non-dedicated fast signalling channel is only resorted to if an existing dedicated channel is not available.

The characteristic features of the method according to the invention are declared in the characterising part of the independent claim for a method.

The invention applies also to a mobile station, the characteristic features of which are declared in the independent claim for a mobile station.

Additionally the invention applies also to a base station, the characteristic features of which are declared in the independent claim for a base station.

The transmission capacity requirement of fast signalling of the kind meant in this patent application is typically relatively small in comparison with the transmission capacity represented by a dedicated transmission channel in a cellular radio system. Therefore allocating a dedicated signalling channel would be most likely to waste allocatable transmission capacity. However, by defining a completely or virtually non-dedicated fast signalling channel it is possible to accommodate a relatively large number of fast signallers into a limited amount of reserved resources.

A completely non-dedicated fast signalling channel is a piece of transmission capacity defined as a combination of time, frequency and possibly other aspects such as code but without any limits as to who can access it. A virtually non-dedicated fast signalling channel is a similar piece of transmission capacity, which however comes with certain (relatively broad) access limits that discriminate between the devices that may attempt fast signalling therethrough. As an example of virtual non-dedicatedness there may be several fast signalling channels defined in a cell so that the mobile stations operative in the cell are divided into fast signalling groups. A mobile station is only allowed to use the fast signalling channel that corresponds to the group into which the mobile station belongs, but within the group the mobile stations belonging to that group are completely equal.

Using a separate fast signalling channel for reverse direction signalling is most reasonable in a situation where setting up a signalling connection would otherwise require the allocation of completely new dedicated communication resources. If, however, a mobile station has already in its use certain allocated uplink capacity, it may be worthwhile to multiplex the fast signalling with other transmission streams sharing the allocated uplink capacity instead of using a separate fast signalling channel. Not only does such multiplexing reduce potential interference to other simultaneous users of the separate fast signalling channel, but it makes also the operation of the mobile station's transmitter simpler because instead of separate transmissions on separate channels only a single multiplexed transmission needs to be emitted.

A multiple access scheme must be devised in order to differentiate between the fast signallers that use a common fast signalling channel. For example time division multiple access, code division multiple access or a combination of these can be used. In the case of code division multiple access, joint detection or multiuser detection as well as antenna array techniques can be applied at the receiving end to alleviate the near/far problem and to enhance the possibility of successful detection.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
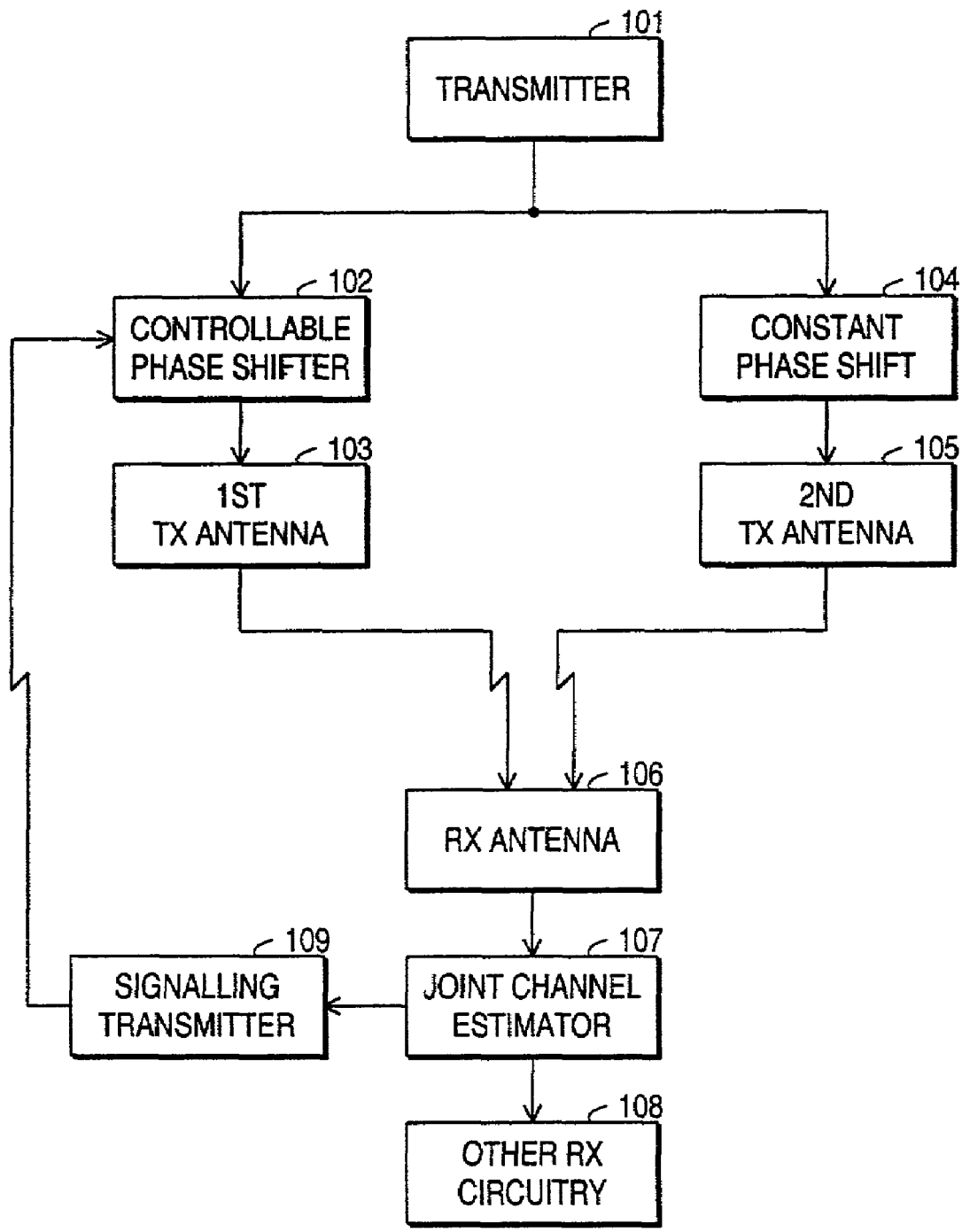
FIG. 1 illustrates schematically the use of fast signalling in association with transmitter diversity.

FIG. 1 shows schematically a communication connection where a transmitter 101 produces a signal to be transmitted and directs it through a controllable phase shifter 102 to a first transmitting antenna 103 as well as through a constant phase shift 104 to a second transmitting antenna 105. The transmitted signals arrive at the receiving antenna 106 of a receiver, from which they are conveyed through a joint channel estimator 107 to other receiver circuitry 108 for demodulation and decoding. The joint channel estimator 107 produces a channel estimate which describes, among other things, the relative phases of different signal components. From the channel estimate it is possible to deduce, what is the phase of the main signal component received from the first transmitting antenna 103 in relation to the phase of the main signal component received from the second transmitting antenna 105. The joint channel estimator 107 outputs this deduction result into a signalling transmitter 109, which transmits it in the upstream or reverse direction as feedback to the transmitting device. On the basis of the feedback it has received from the receiving station, the transmitting station adjusts the phase shift caused in the controllable phase shifter 102 so that the phase difference observed at the receiving station would be as small as possible. Also both transmission branches at the transmitting station may comprise controllable phase shifters.

A fast signalling channel is needed in the upstream or reverse direction for conveying the messages that describe the estimated phase difference at the receiver. Ideally the feedback information should be at the transmitting station in real time, because movements of a mobile station as well as changes in its environment cause relatively rapid changes in the observable reception characteristics. Information regarding a phase difference estimated at a certain moment of time becomes obsolete very quickly.

Figure 2:
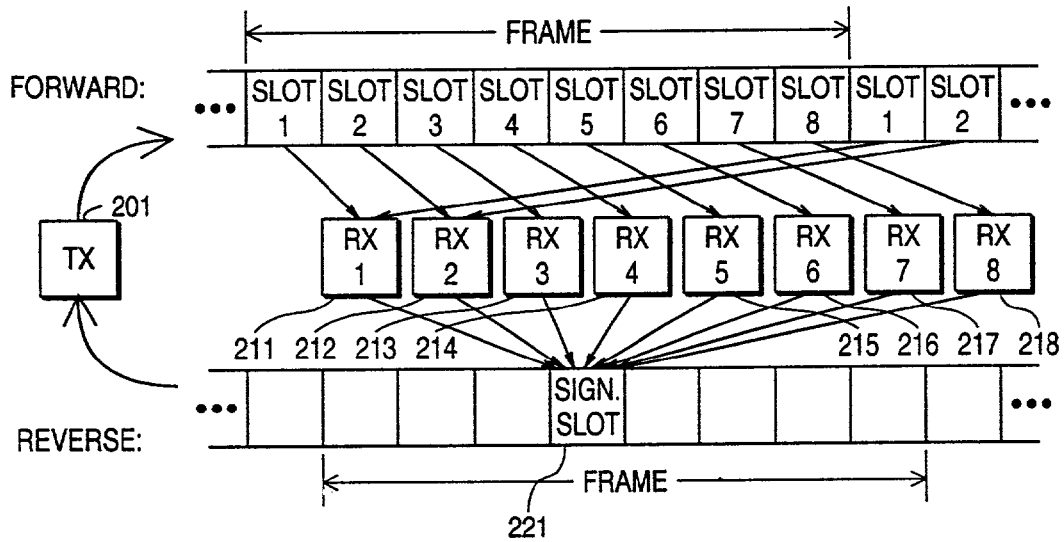
FIG. 2 illustrates the allocation of certain slots in a frame structure.

FIG. 2 illustrates schematically a communication situation where a first station 201, nominally designated as the transmitting station, communicates with eight second stations 211 to 218, nominally designated as the receiving stations. The designations being nominal only comes from the fact that all stations in FIG. 2 both transmit and receive. Time division multiple access (TDMA) is applied in the forward direction so that the transmission of the transmitting station 201 consists of consecutive frames, each frame further consisting of eight consecutive slots. An exemplary radio capacity allocation of the size of one slot has been given to each receiving station so that each of the receiving stations only receives during every eighth slot. For the purposes of the present invention it is irrelevant how the allocations in the forward direction are made. In the reverse direction there exists a common fast signalling channel the resource allocation of which is of the size of one slot 221 per frame. All receiving devices transmit their fast signalling messages during one and the same slot 221 in the reverse direction.

Figure 3A:
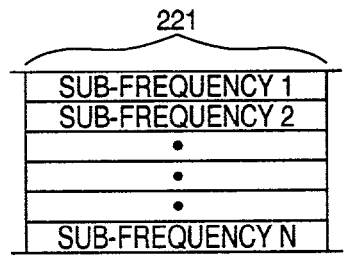
FIGS. 3*a*, 3*b* and 3*c* illustrate certain alternatives of subdividing a slot.
Figure 3B:
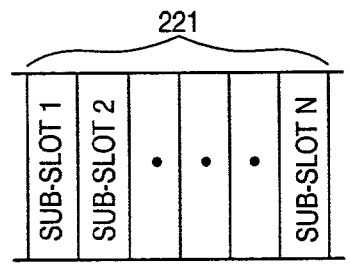
Figure 3C:
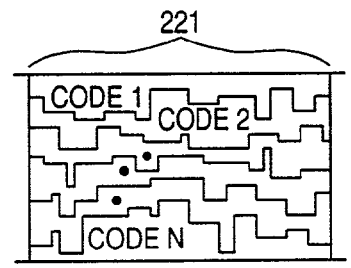

FIGS. 3a, 3b and 3c illustrate some possibilities of accommodating several users into a single slot. A slot in general is defined as a certain frequency bandwidth during a certain duration of time. In FIG. 3a the fast signalling slot 221 is divided in the frequency direction into subfrequencies the temporal duration of which is the same as the temporal duration of the whole slot 221. Each subfrequency consists of a fraction of the total bandwidth of the slot 221. In FIG. 3b the division of a slot 221 into smaller capacity units is made in the time domain so that each subslot fills the whole frequency bandwidth but lasts only for a fraction of the total length of the slot 221. A subslot need not be longer than approximately 20 symbols in order to accommodate a training sequence of 12 to 16 symbols and possibly some information symbols. Guard periods must be used to separate consecutive subslots from each other, just like guard periods are used to separate the known transmissions in the timeslots of a frame from each other. FIG. 3c illustrates schematically the division of a slot 221 into subparts so that each subpart is characterised through a spreading code which is orthogonal or nearly orthogonal with the other codes used during the same slot. Various combinations of the basic solutions of FIGS. 3a, 3b and 3c are also possible.

Figure 4A:
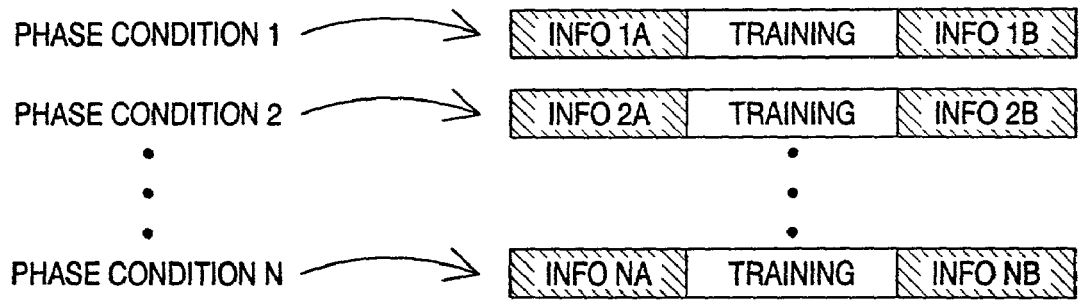
FIGS. 4*a*, 4*b* and 4*c* illustrate certain alternatives for mapping information into messages.
Figure 4B:
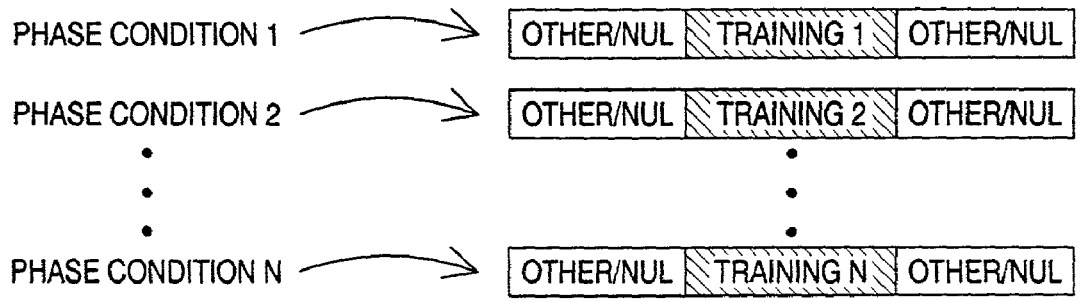
Figure 4C:
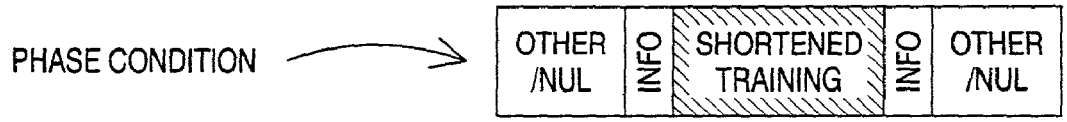

FIGS. 4a, 4b and 4c illustrate alternative ways of conveying information in a single fast signalling message. We assume that a training sequence must be a part of the structure of a fast signalling message in order to enable channel estimation in the device receiving the fast signalling messages and in order to provide a phase reference if and when a phase modulation scheme is employed. The location of the training sequence within the burst is unessential to the present invention; we assume for the sake of example only that the training sequence is in the middle of the burst. FIG. 4a illustrates the more conventional solution where the training sequence is always the same or at least its selection has no dependency on the information to be transmitted. Depending on which of a limited number of discretely defined phase conditions has been observed, certain information bits are selected that represent the observed phase condition, and these information bits are transmitted at the beginning and/or end of the burst. The discretely defined phase conditions are classes or bins like "observed phase difference greater than +π/4 but at most equal to +π/2", with the numerical limiting values selected according to application in question.

FIG. 4b illustrates another solution where there are at least as many mutually alternative training sequences as there are discretely defined phase conditions. A device that wants to declare the observation of a certain discretely defined phase condition just selects the training sequence that has been previously determined to represent that phase condition. From the viewpoint of just declaring the observation result it is then insignificant, what additional information if any is transmitted in the same burst (a burst may even consist of a training sequence only).

FIG. 4c illustrates a solution where a burst contains a shortened training sequence if information regarding observed phase conditions should also be transmitted. The space left free by the omitted parts of an original, longer training sequence are used to convey information regarding the observed phase conditions.

The location of the generally non-dedicated fast signalling channel in the channel scheme of a base station deserves some consideration. If the fast signalling channel comes without any reference to any forward direction channels at all, it is most advantageous to place the fast signalling channel onto a so-called common frequency, which is a frequency used by the mobile stations anyway. For example, each cell has a certain frequency on which the mobile stations may transmit their random access requests. This frequency could also be used for the fast signalling channel. It may even be worthwhile to consider multiplexing the random access channel and the fast signalling channel in some way: for example every second, third or in general Nth random access slot could be replaced with a fast signalling channel slot. This approach is especially advantageous in low-capacity base stations which only have one carrier frequency at their disposal.

Generally it may be helpful to have several fast signalling channel slots occur in various parts of the channel scheme of a base station so that if possible, mobile stations would not be forced to transmit fast signalling information simultaneously with receiving something else; of the several fast signalling channel slots each mobile station could choose a one that does not overlap with the reception time slots of that particular mobile station.

In many conventional cellular radio systems the transmission and reception frequencies come in pairs where a reverse direction frequency is always at a fixed frequency interval from a forward direction frequency. In an embodiment of the invention which is alternative to the above-mentioned use of a common frequency, all mobile stations which have received an allocation for a certain forward direction frequency use a certain slot on the corresponding reverse direction frequency as their fast signalling channel slot. Such an arrangement implements automatically a virtually non-dedicated fast signalling channel because the division into allocated forward frequencies automatically divides the mobile stations into groups. An allocation of a fast signalling channel must be made also for those mobile stations that have no allocated forward direction frequency. For them it is possible to prescribe the use of a slot on the above-mentioned common frequency.

In the foregoing the emphasis has been in applying the invention in association with the use of transmitter diversity at the base station of a cellular radio system. However, the invention is equally applicable to all such situations where a relatively limited amount of information must be provided in one direction between the communicating devices. The changes that are required to the above-given description of applying the invention in association with the use of transmitter diversity are self-explanatory, such as replacing the "phase conditions" in FIGS. 4a, 4b and 4c with some other discrete classes of signalling information to be transmitted.

Figure 5:
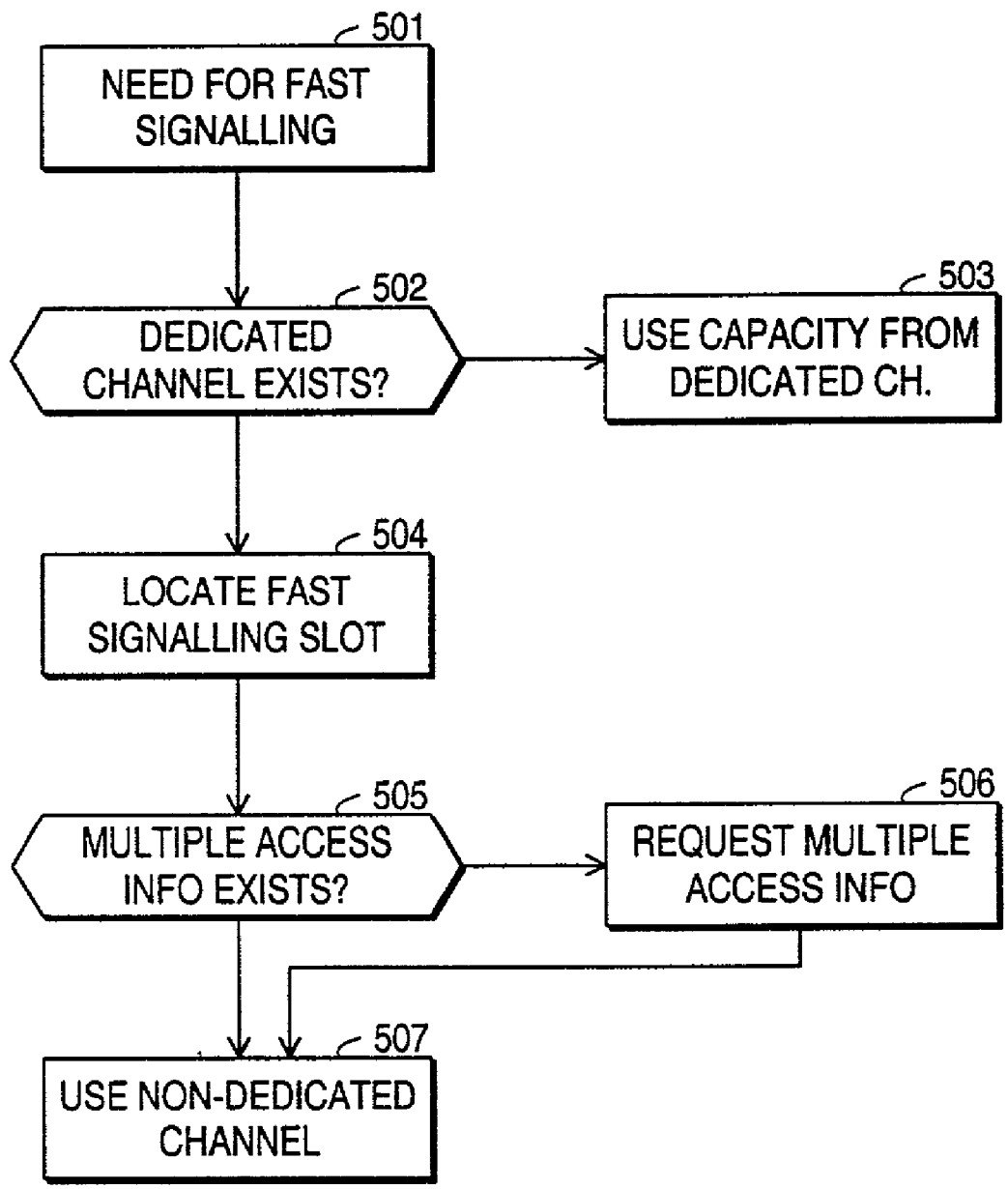
FIG. 5 illustrates a method according to an embodiment of the invention and FIG. 6 illustrates an arrangement according to an embodiment of the invention.

FIG. 5 illustrates schematically a method to be executed by a mobile station. At step 501 the mobile station detects that there exists a need for fast signalling. At step 502 it checks, whether it already has an active communication connection in the reverse direction; in the case of a positive finding the mobile station decides, at step 503, to reuse some of the capacity originally allocated for the active communication connection in the reverse direction for the purposes of fast signalling instead. A negative finding at step 502 means that the mobile station must resort to the use of a generally non-dedicated fast signalling channel, the corresponding slot of which it locates at step 504 unless it has already aware of its location in the channel scheme of the base station.

At step 505 the mobile station checks, whether it already has enough information that it needs to comply with the multiple access scheme on the non-dedicated fast signalling channel. The mobile station must know, how should it process its fast signalling messages in order to enable the base station to separate them from the stream of incoming fast signalling messages and to recognise them. Examples of such processing are transmission at a certain well-defined subfrequency, transmission during a certain well-defined subslot and/or spreading the transmission with a certain well-defined spreading code. The distribution of such information may be a part of the normal processes which the mobile station goes through while registering itself into a cell, in which case every mobile station always has enough information and step 505 is actually unnecessary, or the mobile station may have already used some fast signalling in the immediate past in which case it may presume that it is allowed to use the same multiple access information again. The alternative is that the mobile station must ask the base station for such information according to step 506. When enough information is available, the mobile station may start using the fast signalling process according to step 507.

Steps 503 and 507 may also be executed partly. In a situation where the mobile station has a relatively large amount of fast signalling to transmit, or where there are several parallel bearers active between a mobile station and base station simultaneously and fast signalling must be transmitted regarding at least two of them, it may happen that some of the capacity originally allocated for an active communication connection in the reverse direction can be used for the purposes of fast signalling instead, while the rest of the fast signalling must be made through a non-dedicated fast signalling channel.

Figure 6:
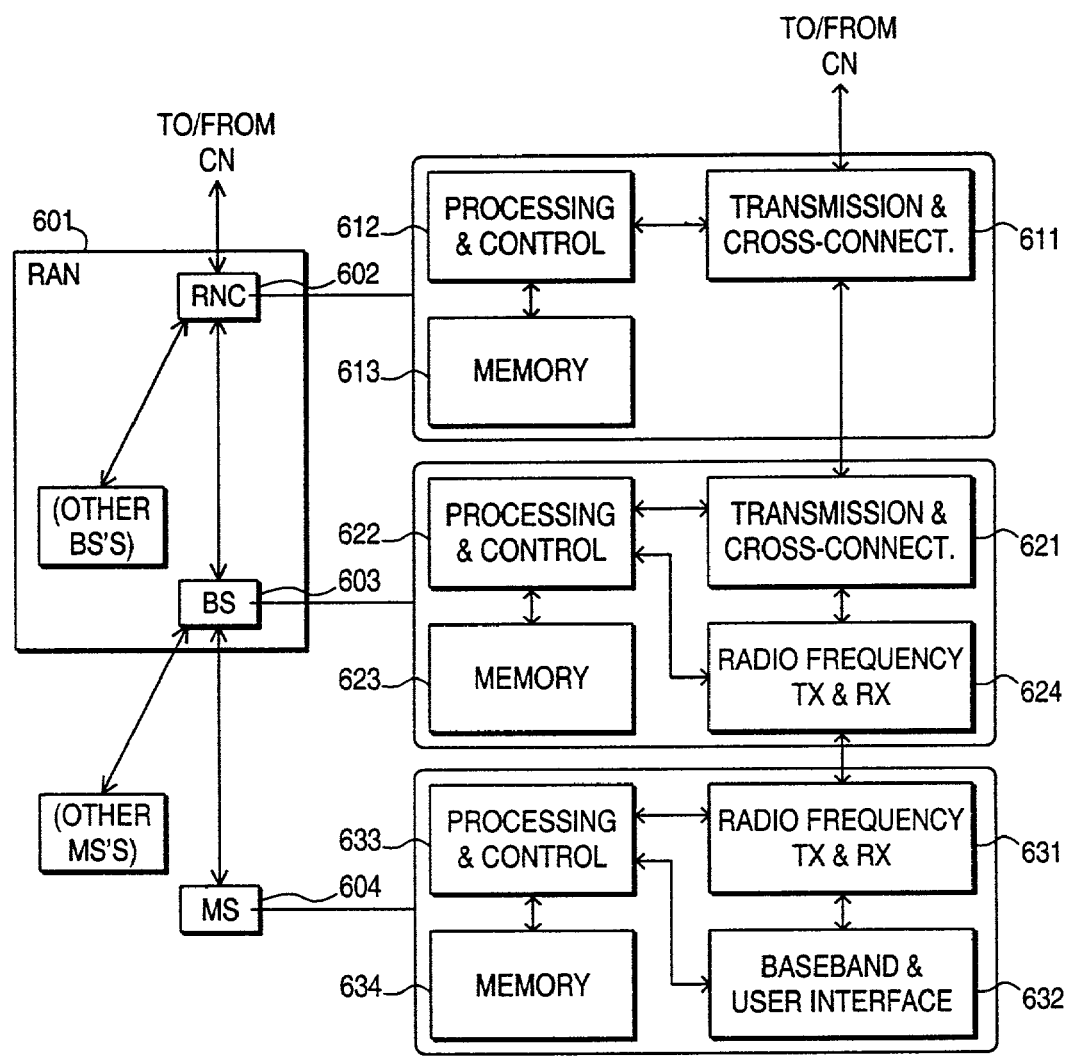

Next we will describe an arrangement according to an embodiment of the invention. FIG. 6 illustrates, on the left side, a radio access network (RAN) 601 the main components of which are a radio network controller (RNC) 602 and at least one base station (BS) 603, of which the former is coupled to control and communicate with the latter. Terminology varies from one cellular radio system to another so that for example a unit corresponding to the RAN may also be known as the base station subsystem (BSS), a unit corresponding to the RNC may also be known as the base station controller (BSC) and a unit corresponding to the BS may also be known as the base transceiver station (BTS). In the hierarchy of the cellular radio system, above the RAN there is the core network (CN) where the RNCs communicate mainly with mobile switching centres (MSC; not shown in FIG. 6). Below the RAN there are the mobile stations (MS) 604 so that a mobile station is arranged to communicate with at least one base station.

The right side of FIG. 6 illustrates schematically some functional parts of the RNC, the BS and the MS. The main functions of an RNC are to act as a central hub in all communications within the RAN and from the RAN to the CN, to administrate the allocation of radio capacity at each base station and to perform overall control functions. For routing the communication connections the RNC comprises a transmission and cross-connecting unit 611. A processing and control entity 612 is arranged to control the operation of the transmission and cross-connecting unit 611. Further coupled to the processing and control entity 612 there is a memory 613. The base station comprises also a transmission and cross-connecting unit 621 for coupling it to the internal communications network of the RAN, as well as a processing and control entity 622 and a memory 623. The transmission and cross-connecting unit 621 is also coupled to a radio frequency transmitter and receiver unit 624 for implementing the radio interface towards the mobile stations. A radio frequency transmitter and receiver unit 631 acts as the counterpart of the radio frequency transmitter and receiver unit 624 of the base station and communicates with the baseband and user interface parts 632 of the mobile station. A processing and control entity 633 and a memory 634 are also present in the mobile station.

According to the invention, the RNC 602 is arranged to reserve from the radio capacity allocation scheme of each base station some reverse direction capacity for the needs of fast signalling. This part of the arrangement according to the invention is most straightforwardly implemented by writing a corresponding instruction into the computer program that is stored in the memory 613 and that the processing and control entity 612 executes in performing its allocation tasks. Writing such an instruction into a computer program is as such within the capabilities of a person skilled in the art.

Similarly according to the invention the base station 603 is arranged to receive fast signalling messages within the reverse direction capacity allocated by the RNC 602 or in association with other uplink transmissions from the mobile stations, to demodulate and decode the received fast signalling messages and to respond to the received, demodulated and decoded fast signalling messages in an appropriate way, be it the setting of an antenna phase shift into a desired value or any other action that the mobile station desired that sent the fast signalling message. The base station 603 is also arranged to announce to the mobile stations within its cell the location, within the radio capacity allocation scheme, of the radio capacity dedicated to fast signalling. This part of the arrangement according to the invention is most straightforwardly implemented by writing corresponding instructions into the computer program that is stored in the memory 623 and that the processing and control entity 622 executes in performing its tasks in controlling the operation of the radio frequency transmitter and receiver unit 624. Writing such instructions into a computer program is as such within the capabilities of a person skilled in the art.

Further according to the invention the mobile station 604 is arranged to detect the need for transmitting fast signalling and to generate and transmit the fast signalling as needed. Again this part of the arrangement according to the invention is most straightforwardly implemented by writing corresponding instructions into the computer program that is stored in the memory 634 and that the processing and control entity 633 executes in performing its tasks in controlling the operation of the radio frequency transmitter and receiver unit 631. Writing such instructions into a computer program is as such within the capabilities of a person skilled in the art.

In the foregoing we have primarily referred to fast signalling in the direction from the mobile station(s) to a base station. At the priority date of this patent application it is regarded as the most probable area of application of fast signalling, because most communication connections that have asymmetric capacity requirements will probably be asymmetric in that way that the majority of information to be communicated comes from the base station to the mobile station. However, the invention is not limited to the applicability of fast signalling in the uplink direction. It is well possible to define a fast signalling channel in the downlink direction to be used for such fast signalling that accompanies a major flow of information in the uplink direction. For example, a number of mobile stations capable of packet-switched reception in a cell may be ordered to listen to a certain cyclically occurring timeslot in the frame structure used in the cell where the mobile stations are currently operating. The main purpose of such ordering may be that the mobile stations are ready to receive packets belonging to a packet-switched communication connection in the assigned timeslot. In the absence of such packets the same timeslot may be used for fast signalling in the downlink direction, because the mobile stations are listening to that timeslot anyway and no new allocations need to be made.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The invention claimed is:

1. A method for implementing fast signalling in a communication connection between a base station and a mobile station of a cellular radio network, comprising the steps of:
defining an arrangement of repeatedly occurring frames that consist of pieces of allocatable radio communication capacity between the base station and mobile stations communicating therewith,
allocating pieces of radio communication capacity from the arrangement of repeatedly occurring frames to dedicated communication channels,
allocating a piece of radio communication capacity from the arrangement of repeatedly occurring frames to a non-dedicated fast signalling channel, and
using said piece of radio communication capacity allocated to a non-dedicated fast signalling channel for conveying fast signalling feedback messages between at least one mobile station and the base station, wherein the messages describe estimated phase differences between signals received from plural transmission atennas.

2. A method according to claim 1, wherein the step of allocating a piece of radio communication capacity from the arrangement of repeatedly occurring frames to a non-dedicated fast signalling channel comprises the step of allocating a piece of radio communication capacity from the arrangement of repeatedly occurring frames to a completely non-dedicated fast signalling channel, so that all mobile stations communicating with said base station are equally allowed to use said non-dedicated fast signalling channel.

3. A method according to claim 1, wherein the step of allocating a piece of radio communication capacity from the arrangement of repeatedly occurring frames to a non-dedicated fast signalling channel comprises the step of allocating a piece of radio communication capacity from the arrangement of repeatedly occurring frames to a virtually non-dedicated fast signalling channel, so that a well-defined subgroup of all mobile stations communicating with said base station are mutually equally allowed to use said non-dedicated fast signalling channel.

4. A method according to claim 3, comprising the step of announcing by the base station to a mobile station, into which subgroup of all mobile stations communicating with said base station the mobile station belongs.

5. A method according to claim 1, wherein the step of using said piece of radio communication capacity allocated to a non-dedicated fast signalling channel for conveying fast signalling messages comprises the substep of using a multiple access arrangement to separate fast signalling transmissions relating to several mobile stations from each other.

6. A method according to claim 5, comprising the step of separating fast signalling transmissions relating to several mobile stations from each other through frequency division multiple access.

7. A method according to claim 5, comprising the step of separating fast signalling transmissions relating to several mobile stations from each other through time division multiple access.

8. A method according to claim 5, comprising the step of separating fast signalling transmissions relating to several mobile stations from each other through code division multiple access.

9. A method according to claim 5, comprising the step of separating fast signalling transmissions relating to several mobile stations from each other through a combination of at least two of frequency division multiple access, time division multiple access and code division multiple access.

10. A method according to claim 1, wherein the step of using said piece of radio communication capacity allocated to a non-dedicated fast signalling channel for conveying fast signalling messages comprises the substep of transmitting a fast signalling message where a training sequence is accompanied by at least one information symbol additional to the training sequence.

11. A method according to claim 1, wherein the step of using said piece of radio communication capacity allocated to a non-dedicated fast signalling channel for conveying fast signalling messages comprises the substep of transmitting a fast signalling message where a training sequence is accompanied by at least information symbol that replaces a part of the training sequence.

12. A method according to claim 1, wherein the step of using said piece of radio communication capacity allocated to a non-dedicated fast signalling channel for conveying fast signalling messages comprises the substep of transmitting a fast signalling message where a training sequence is selected from a number of alternative training sequences in order to convey a piece of information through the selection of a particular training sequence.

13. A method according to claim 1, comprising the steps of:
allocating several differently located pieces of radio communication capacity from the arrangement of repeatedly occurring frames to non-dedicated fast signalling channels in the communication direction from the mobile stations to the base station and
allowing mobile stations to choose among said allocated pieces of radio communication capacity allocated to non-dedicated fast signalling channels in order to enable conveying fast signalling messages from the mobile stations to the base station in a way that is convenient to each mobile station.

14. A method according to claim 1, comprising the steps of:
  examining, whether a part of an existing dedicated communication connection between the mobile station and the base station is available for conveying fast signalling messages between said mobile station and the base station and
  only if such a part of an existing dedicated communication connection between the mobile station and the base station is not found to be available for conveying fast signalling messages between said mobile station and the base station, implementing the step of using said piece of radio communication capacity allocated to a non-dedicated fast signalling channel for conveying fast signalling messages between said mobile station and the base station.

15. A method according to claim 1, comprising the steps of:
  examining, whether a part of an existing dedicated communication connection between the mobile station and the base station is available for conveying fast signalling messages between said mobile station and the base station and
  only if such a part of an existing dedicated communication connection between the mobile station and the base station is not found to be available for conveying all required fast signalling messages between said mobile station and the base station, implementing the step of using said piece of radio communication capacity allocated to a non-dedicated fast signalling channel for conveying those fast signalling messages between said mobile station and the base station for which no part of an existing dedicated communication connection was found to be available.

16. A mobile station of a cellular radio network, comprising:
  means for setting up communication connections between it and base stations of the cellular radio network,
  means for observing an arrangement of repeatedly occurring frames that consist of pieces of allocatable radio communication capacity between the base station and mobile stations communicating therewith,
  means for locating such a piece of radio communication capacity within the arrangement of repeatedly occurring frames which is allocated to a non-dedicated fast signalling channel, and
  means for utilising said piece of radio communication capacity allocated to a non-dedicated fast signalling channel by transmitting or receiving fast signalling feedback messages between at least one mobile station and the base station, wherein the messages describe estimated phase differences between signals received from plural transmission antennas.

17. A mobile station according to claim 16, comprising:
  means for examining, whether a part of an existing dedicated communication connection in the communication direction from the mobile station to the base station is available for conveying fast signalling messages from said mobile station to the base station and
  means for utilising such a part of an existing dedicated communication connection, if found to be available, by transmitting fast signalling messages to said base station, and only utilising said piece of radio communication capacity allocated to a non-dedicated fast signalling channel by transmitting fast signalling messages to said base station is no part of an existing dedicated communication connection was found to be available.

18. A mobile station according to claim 16, comprising:
  means for examining, whether a part of an existing dedicated communication connection in the communication direction from the mobile station to the base station is available for conveying at least some fast signalling messages from said mobile station to the base station and
  means for utilising such a part of an existing dedicated communication connection, if found to be available, by transmitting fast signalling messages to said base station, and only utilising said piece of radio communication capacity allocated to a non-dedicated fast signalling channel by transmitting those fast signalling messages to said base station for which no part of an existing dedicated communication connection was found to be available.

19. A base station of a cellular radio network, comprising:
  means for setting up communication connections between it and mobile stations of the cellular radio network,
  means for setting up an arrangement of repeatedly occurring frames that consist of pieces of allocatable radio communication capacity between the base station and mobile stations communicating therewith,
  means for indicating such a piece of radio communication capacity within the arrangement of repeatedly occurring frames which is allocated to a non-dedicated fast signalling channel and
  means for utilising said piece of radio communication capacity allocated to a non-dedicated fast signalling channel by receiving or transmitting fast signalling feedback messages between at least one mobile station and the base station, wherein the messages describe estimated phase differences between signals received from plural transmission antennas.

20. An apparatus for implementing fast signalling in a communication link of a cellular radio network, the apparatus comprising:
  a transmitter of a signal having an arrangement of repeatedly occurring frames defining pieces of allocatable radio communication capacity between stations of the network;
  a controller allocating pieces of radio communication capacity from the arrangement of repeatedly occurring frames to dedicated communication channels of the network, the controller further allocating a piece of radio communication capacity from the arrangement of repeatedly occurring frames to a non-dedicated fast signalling channel of the network; and
  wherein said piece of radio communication capacity allocated to a non-dedicated fast signalling channel serves for conveying fast signalling feedback between at least one mobile station and the base station, wherein the messages describe estimated phase differences between signals received from plural transmission antennas.

21. A method comprising:
  implementing fast signalling in a communication connection between stations of a cellular radio network;
  defining an arrangement of repeatedly occurring frames that consist of pieces of allocatable radio communication capacity between said stations of the network;
  allocating pieces of radio communication capacity from the arrangement of repeatedly occurring frames to dedicated communication channels of the network;

allocating a piece of radio communication capacity from the arrangement of repeatedly occurring frames to a non-dedicated fast signalling channel of the network; and using said piece of radio communication capacity, allocated to the non-dedicated fast signalling channel, for conveying fast signalling feedback messages between at least one mobile station and the base station, wherein the messages describe estimated phase differences between signals received from plural transmission antennas.

22. A computer readable medium storing a computer program for implementing fast signalling in a communication link of a cellular radio network, the computer program product including a storage media for storing steps of a program for implementing fast signalling in a communication link between stations of a cellular radio network, the program steps comprising:

defining an arrangement of repeatedly occurring frames that consist of pieces of allocatable radio communication capacity between said stations of the network;

allocating pieces of radio communication capacity from the arrangement of repeatedly occurring frames to dedicated communication channels of the network;

allocating a piece of radio communication capacity from the arrangement of repeatedly occurring frames to a non-dedicated fast signalling channel of the network; and using said piece of radio communication capacity, allocated to the non-dedicated fast signalling channel, for conveying fast signalling feedback messages between said network stations, wherein the messages describe estimated phase differences between signals received from plural transmission antennas.

23. A method for implementing fast signalling in a communication connection between a base station and a mobile station of a cellular radio network, comprising the steps of:

defining an arrangement of repeatedly occurring frames that consist of pieces of allocatable radio communication capacity between the base station and mobile stations communicating therewith, allocating pieces of radio communication capacity from the arrangement of repeatedly occurring frames to dedicated communication channels, allocating a piece of radio communication capacity from the arrangement of repeatedly occurring frames to a non-dedicated fast signalling channel, and using said piece of radio communication capacity allocated to a non-dedicated fast signalling channel for conveying fast signalling messages between at least one mobile station and the base station by transmitting a fast signalling message with a training sequence, wherein the training sequence is accompanied by at least one information symbol additional to the training sequence, or the training sequence is accompanied by at least information symbol that replaces a part of the training sequence, or the training sequence is selected from a number of alternative training sequences in order to convey a piece of information through the selection of a particular training sequence.

* * * * *